Patented Jan. 17, 1933

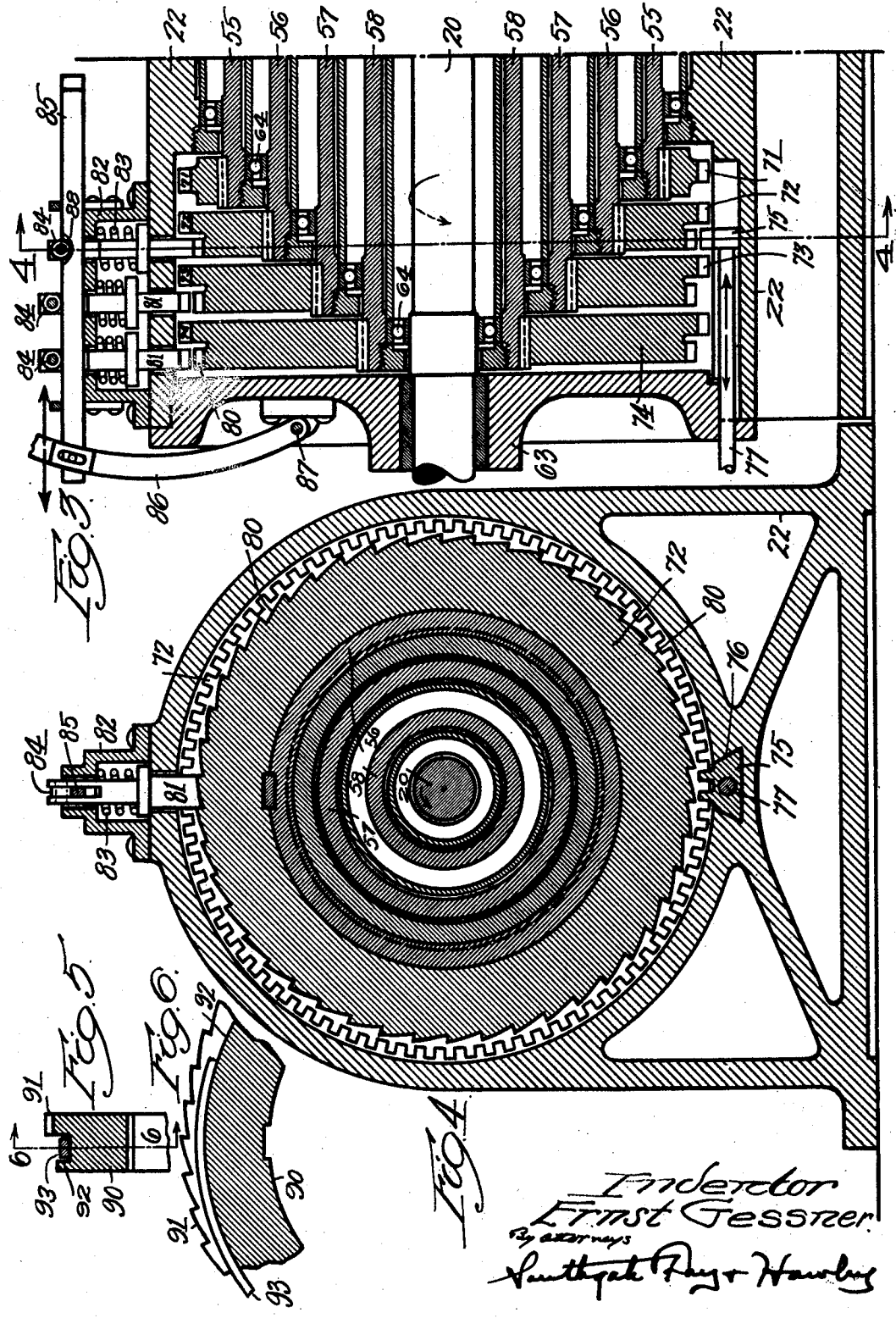

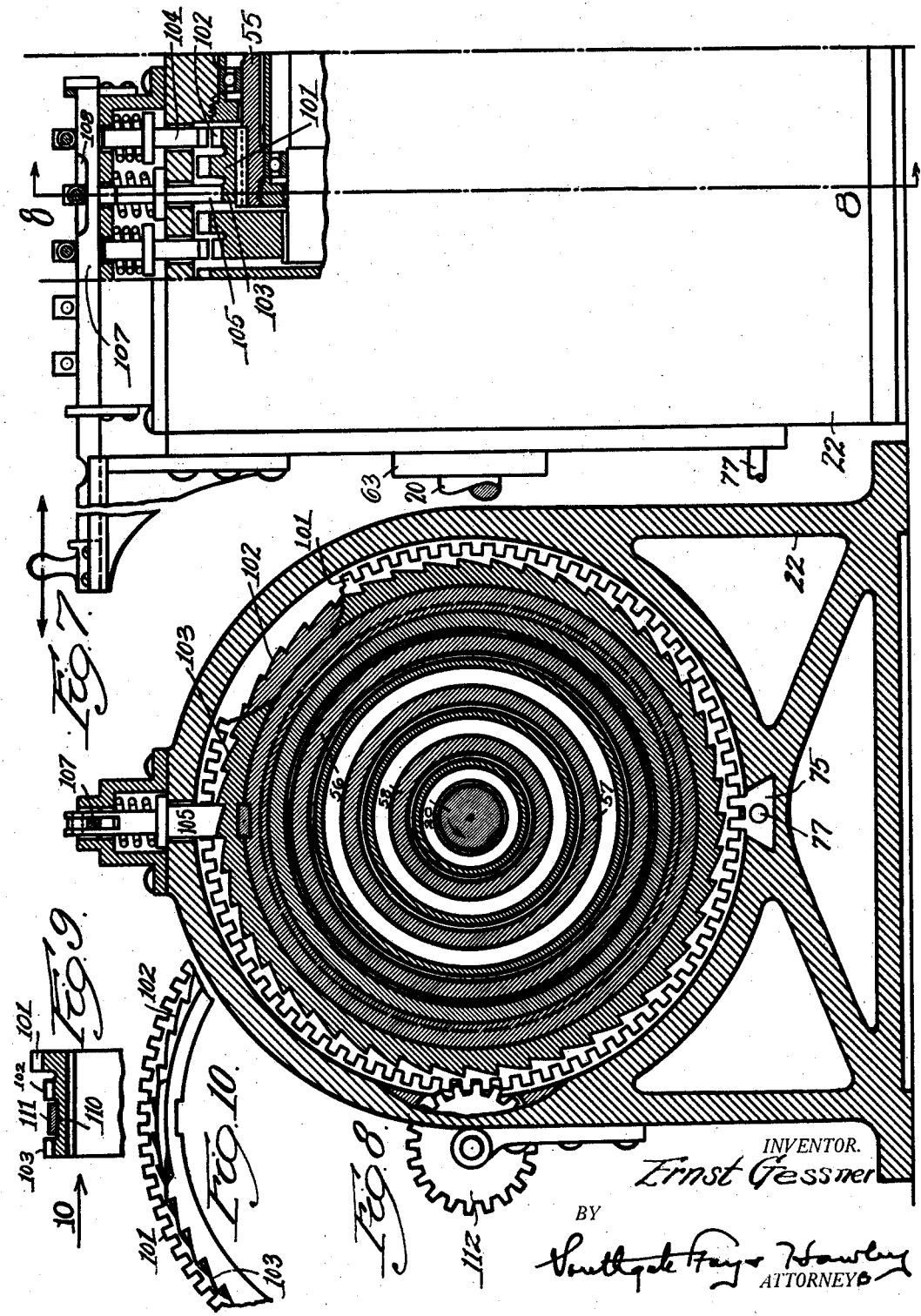

1,894,397

UNITED STATES PATENT OFFICE

ERNST GESSNER, OF WORCESTER, MASSACHUSETTS

VARIABLE SPEED TRANSMISSION MECHANISM

Application filed November 2, 1931. Serial No. 572,520.

This invention relates to transmission mechanism by the use of which different rotative speeds may be selectively obtained. The invention relates more particularly to the type of variable speed transmission mechanism shown in my prior Patent No. 1,797,982, issued to me March 24, 1931.

It is the general object of my present invention to provide certain improvements in variable speed transmission mechanism of the type shown in my prior patent, by which improvements the driven member is permitted to over-run the driving member under certain operating conditions. Such conditions frequently arise when my transmitting mechanism is used in an automobile drive and my invention permits the advantages of "free-wheeling" to be attained.

Preferred forms of the invention are shown in the drawings, in which

Fig. 3 is a sectional side elevation of the opposite end portion of my transmission mechanism;

Fig. 4 is a sectional end elevation, taken along the line 4—4 in Fig. 3;

Fig. 5 is a detail sectional view of a modified construction;

Fig. 6 is a sectional elevation, taken along the line 6—6 in Fig. 5;

Fig. 7 is a side elevation, partly in section, showing a further modification;

Fig. 8 is a sectional end elevation, taken along the line 8—8 in Fig. 7;

Fig. 9 is a detail sectional view of a further modification, and

Fig. 10 is a partial side elevation, looking in the direction of the arrow 10 in Fig. 9.

Figure 1:
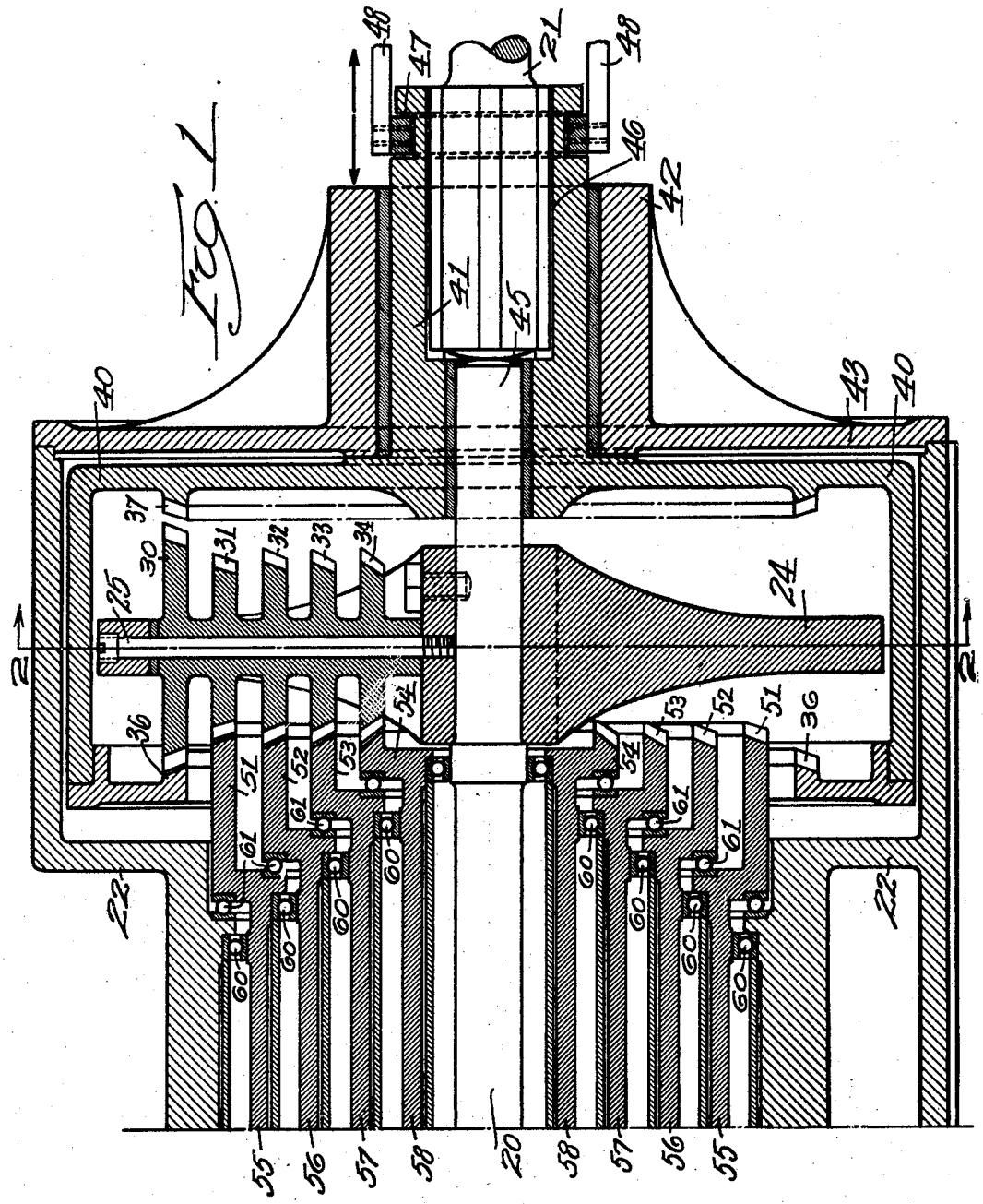
Fig. 1 is a sectional side elevation of one end portion of my improved mechanism.
Figure 2:
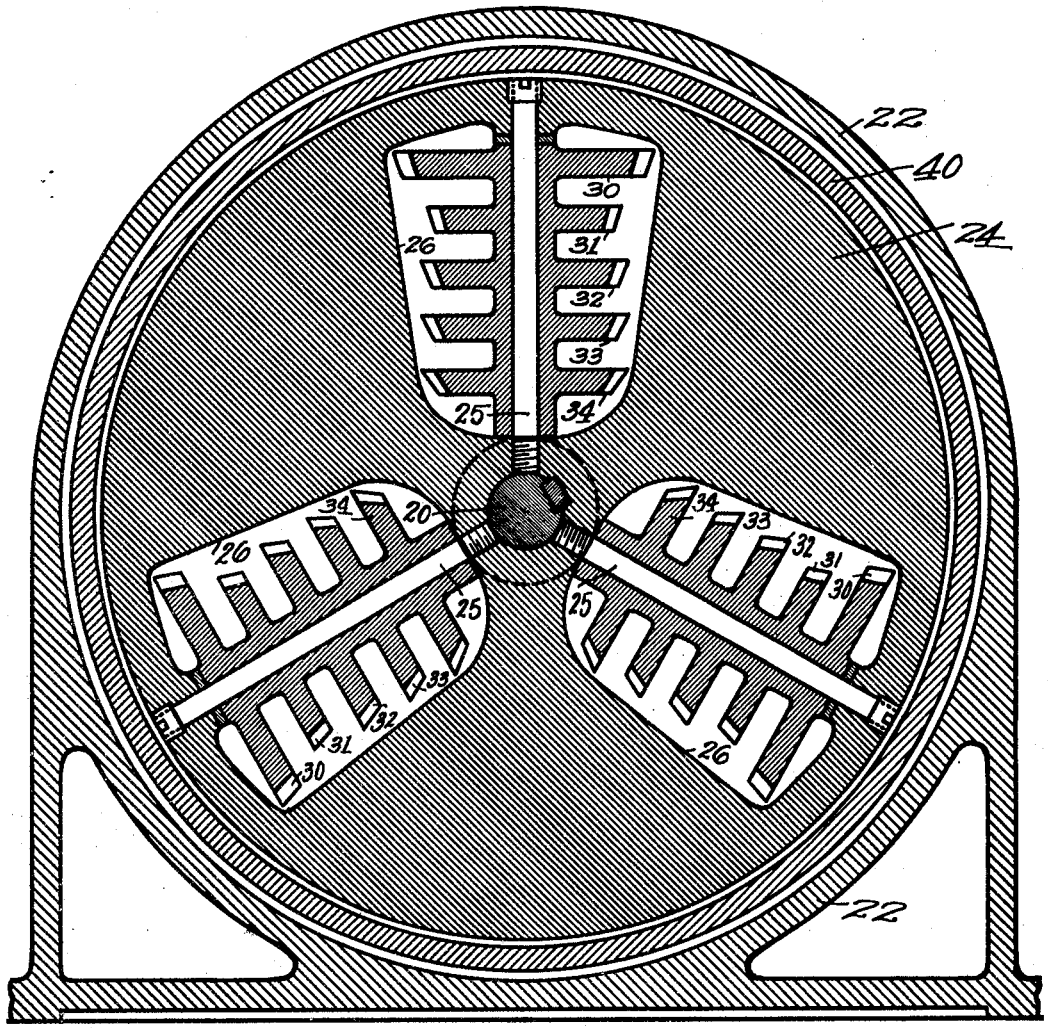
Fig. 2 is a sectional end elevation, taken along the line 2—2 in Fig. 1.

Referring to Figs. 1 and 2, I have shown certain parts of a transmission mechanism of the general type appearing in my former Patent No. 1,797,982. These parts include a driving shaft 20, a driven shaft 21 and an enclosing frame 22, within which the shafts 20 and 21 are rotatably mounted.

A carrier 24 is secured to the driving shaft 20 and is provided with a plurality of radially mounted rods or shafts 25, extending outward through openings 26 (Fig. 2) in the carrier 24. A series of bevel pinions 30, 31, 32, 33 and 34 are mounted to rotate in unison on each radial rod or shaft 25 in each opening 26. These bevel pinions are preferably formed on a common hub or bearing portion and may be of different diameters, as indicated in Fig. 1.

The outer bevel pinions 30 may be selectively engaged by bevel gears 36 or 37, formed on the inner side walls of a casing 40 rotatable within the enclosing frame 22. The casing 40 has a hub portion 41 rotatable in a bearing 42 formed on the head 43 of the frame 22.

The driving shaft 20 preferably extends beyond the carrier 24 and has an end portion 45 supported in a bearing in the hub 41 of the casing 40. The driven shaft 21 extends into a recess 46 in the hub 41.

The hub 41 is provided with an annular groove 47 receiving the inwardly projecting ends of yoke members 48, by which the hub 41 and casing 40 may be shifted axially relatively to the shafts 20 and 21, thereby causing the bevel gears 36 or 37 to selectively engage the bevel pinions 30.

The bevel pinions 31 to 34 engage bevel gears 51 to 54 which are formed on the ends of sleeves 55 to 58 mounted within the frame 22 and concentric with the driving shaft 20. Suitable anti-friction bearings 60 and 61 may be provided for the sleeves 55 to 58, the bearings 61 receiving the end thrust on the gears 51 to 54.

The construction thus far described is in general substantially similar to the construction shown in my prior patent above designated.

Referring to Figs. 3 and 4, the driving shaft 20 is supported at its left hand end in a bearing 63 on the frame 22, and additional bearings 64 are provided for the sleeves 55 to 58. Ring gears 71 to 74 are fixed to the left hand ends of the sleeves 55 to 58 and may be engaged by gear teeth on a block 75, slidable in guideways 76 (Fig. 4) in the frame 22.

An actuating rod 77 is provided for the block 75, by which the teeth of the block may be caused to engage any one of the ring gears 71 to 74. When thus engaged, the corresponding bevel gears 51 to 54 will be held from rotation and the corresponding pinions 31 to 34 will roll on this fixed bevel gear as the driving shaft rotates the carrier 24.

This will cause the bevel pinions 30 to be rotated at a definite speed, producing corresponding rotation of the gear 36 or 37 engaged thereby and thus positively rotating the driven shaft 21 at a predetermined speed and in a predetermined direction. Whenever one of the ring gears 71 to 74 is held from rotation, the remaining gears are freely rotated at differential speeds produced by the engagement of their respective bevel gears and bevel pinions.

Each ring gear 72 to 74 is provided with a ratchet portion 80 engaged by a pawl 81 formed at the end of a spring plunger mounted for radial movement in a bearing frame 82 and yieldingly pressed inward by a coil spring 83. A roll 84 is provided in the forked upper end of each plunger 81 and these rolls engage the upper edge of a bar 85 slidable in guideways on the bearing frame 82. The bar 85 may be actuated by a hand lever 86 mounted on a fixed pivot 87.

The bar 85 is provided with a depressed portion or recess 88 which may be brought into alignment with any one of the rolls 84. When thus positioned, the corresponding pawl or plunger 81 is free to move inward and to engage the ratchet teeth on the associated ring gear. The pawl 81 will then positively prevent rotation of the ring gear in one direction, but free rotation of the gear in the opposite direction will be permitted. Consequently the driving shaft 20 will positively rotate the driven shaft 21 at a predetermined speed ratio but the driven shaft 21 is permitted to rotate freely at any higher speed.

The driving mechanism shown in my prior patent is thus adapted for use in automobiles to effect the so-called "free-wheeling", but my improvements are not limited to this particular use.

In place of the ring gear and sliding toothed block, I may substitute the construction shown in Figs. 5 and 6, in which a ring 90 is provided with a ratchet portion 91 and with an annular recess or brake-drum 92 in which a brake-band 93 is positioned. Any convenient device may be used for selectively tightening the brake-band corresponding to a selected ring 90, it being understood that a series of such rings are provided corresponding to the ring gears 71 to 74. For a detailed disclosure of suitable brake-applying mechanism, reference is made to my prior patent above identified.

When the bevel gear 51 is held from rotation, the gear ratio is such that the direction of rotation of the driven member 21 will be in one direction when the pinions 30 engage the gear 37 and in the opposite direction when the pinions 30 engage the gear 36.

In order to permit free over-running with the gear 51 and pinions 31 in control, I provide the construction shown in Figs. 7 and 8, in which the ring gear 101 on the sleeve 55 is provided with two sets of ratchet teeth 102 and 103, facing in opposite directions, and with two pawls 104 and 105, also facing in opposite directions.

The sliding bar 107, corresponding to the bar 85 previously described, is provided with an auxiliary recess 108 which may be positioned to cause either pawl 104 or 105 to become operative and the other pawl inoperative, according to the engagement of the pinions 30 (Fig. 1) with the bevel gears 36 or 37.

The recess 108 is preferably long enough so that both pawls 104 and 105 may be released, thus locking the gear 101 from movement in both directions when desired.

In Figs. 9 and 10, I have indicated that the gear 101 may be further provided with a brake drum portion 110 and brake-band 111, as previously described in connection with Figs. 5 and 6. It will also be understood that pinions 112 (Fig. 8) may be provided, as in my previous patent, by which the ring gears may be positively rotated, thus affording additional speed ratios or through which power may be taken off from the ring gears if desired.

Having described several forms of my improved transmission mechanism, it will be seen that I have provided in each form for selective over-running of the driven member when so desired, and that in the case of the gear 51 and pinions 31, I have provided for selective over-running in either direction, according to the setting of the bevel gear casing 40. The transmission mechanism shown in my prior patent is thus adapted for additional and valuable methods of operation.

Having thus described my invention and the advantages thereof, I do not wish to be limited to the details herein disclosed, otherwise than as set forth in the claims, but what I claim is:—

1. A transmission mechanism comprising a driving shaft, a driven shaft, a carrier mounted on said driving shaft, radial shafts mounted in said carrier, a bevel pinion mounted to rotate about the axis of each radial shaft, bevel gears mounted at each side of said bevel pinion and selectively engageable therewith by relative axial movement of said bevel gears and carrier, driving connections between said bevel gears and said driven shaft, a series of additional bevel pinions mounted on each radial shaft and rotatable in unison with said first-named bevel pinions, bevel gears engaging said additional bevel pinions, concentric sleeves supporting said last-named bevel gears, and selective means to hold one of said sleeves from rotation in one direction but permitting free rotation in the other direction, the remainng sleeves and supported bevel gears being left free to rotate in either direction.

2. A transmission mechanism comprising a driving shaft, a driven shaft, a carrier mounted on said driving shaft, radial shafts mounted in said carrier, a bevel pinion mounted to rotate about the axis of each radial shaft, bevel gears mounted at each side of said bevel pinion and selectively engageable therewith by relative axial movement of said bevel gears and carrier, driving connections between said bevel gears and said driven shaft, a series of additional bevel pinions mounted on each radial shaft and rotatable in unison with said first-named bevel pinions, bevel gears engaging said additional bevel pinions, concentric sleeves supporting said last-named bevel gears, selective means to hold one of said sleeves from rotation in one direction but permitting free rotation in the other direction, and additional selective means effective to prevent rotation of said sleeves in either direction.

3. A transmission mechanism comprising a driving shaft, a driven shaft, a carrier mounted on said driving shaft, radial shafts mounted in said carrier, a bevel pinion mounted to rotate about the axis of each radial shaft, bevel gears mounted at each side of said bevel pinion and selectively engageable therewith by relative axial movement of said bevel gears and carrier, driving connections between said bevel gears and said driven shaft, a series of additional bevel pinions mounted on each radial shaft and rotatable in unison with said first-named bevel pinions, bevel gears engaging said additional bevel pinions, concentric sleeves supporting said last-named bevel gears, selective means to hold one of said sleeves from rotation in one direction but permitting free rotation in the other direction, and additional selective means effective to prevent rotation of said sleeves in either direction, said additional means comprising a brake-drum and a brake-band engageable therewith.

4. A transmission mechanism comprising a driving shaft, a driven shaft, a carrier mounted on said driving shaft, radial shafts mounted in said carrier, a bevel pinion mounted to rotate about the axis of each radial shaft, bevel gears mounted at each side of said bevel pinion and selectively engageable therewith by relative axial movement of said bevel gears and carrier, driving connections between said bevel gears and said driven shaft, a series of additional bevel pinions mounted on each radial shaft and rotatable in unison with said first-named bevel pinions, bevel gears engaging said additional bevel pinions, concentric sleeves supporting said last-named bevel gears, ratchet wheels on said sleeves, pawls selectively engageable with said ratchet wheels and permitting free rotation of said wheels in one direction when thus engaged, springs to move said pawls to engaging position, and manually operable means for releasing a selected pawl for movement by its associated spring to engage its associated ratchet wheel.

5. A transmission mechanism comprising a driving shaft, a driven shaft, a carrier mounted on said driving shaft, radial shafts mounted in said carrier, a bevel pinion mounted to rotate about the axis of each radial shaft, bevel gears mounted at each side of said bevel pinion and selectively engageable therewith by relative axial movement of said bevel gears and carrier, driving connections between said bevel gears and said driven shaft, a series of additional bevel pinions mounted on each radial shaft and rotatable in unison with said first-named bevel pinions, bevel gears engaging said additional bevel pinions, concentric sleeves supporting said last-named bevel gears, ratchet wheels on said sleeves, pawls selectively engageable with said ratchet wheels and permitting free rotation of said wheels in one direction when thus engaged, springs to move said pawls to engaging position, and manually operable means for releasing a selected pawl for movement by its associated spring to engage its associated ratchet wheel, each pawl having a roll associated therewith and said manually operated means comprising a slidable bar having a roll-receiving recess in one portion thereof.

6. A transmission mechanism comprising a driving shaft, a driven shaft, a carrier mounted on said driving shaft, radial shafts mounted in said carrier, a bevel pinion mounted to rotate about the axis of each radial shaft, bevel gears mounted at each side of said bevel pinion and selectively engageable therewith by relative axial movement of said bevel gears and carrier, driving connections between said bevel gears and said driven shaft, a series of additional bevel pinions mounted on each radial shaft and rotatable in unison with said first-named bevel pinions, bevel gears engaging said additional bevel pinions, concentric sleeves supporting said last-named bevel gears, oppositely facing ratchet wheels mounted on one of said sleeves, pawls selectively engageable with said ratchet wheels, and means to cause neither, either, or both of said pawls to engage said ratchet wheels, whereby said sleeve may be held from free rotation in a selected direction or in both or neither directions.

7. The combination in a transmission mechanism as set forth in claim 6, in which each pawl has a roll associated therewith, and in which said latter means comprises a slidable bar having a roll-receiving recess in one portion thereof and in which said recess is long enough to simultaneously receive the rolls on two adjacent pawls.

In testimony whereof I have hereunto affixed my signature.

ERNST GESSNER.